United States Patent [19]

Ichikawa

[11] Patent Number: 5,113,185

[45] Date of Patent: May 12, 1992

[54] CURRENT LOCATION INDICATION APPARATUS FOR USE IN AN AUTOMOTIVE VEHICLE

[75] Inventor: Akira Ichikawa, Saitama, Japan

[73] Assignee: Honda Giken Kogyo Kabushiki Kaisha, Tokyo, Japan

[21] Appl. No.: 593,277

[22] Filed: Oct. 1, 1990

Related U.S. Application Data

[63] Continuation of Ser. No. 460,543, Jan. 3, 1990, abandoned, which is a continuation of Ser. No. 487,589, Apr. 22, 1983, abandoned.

[30] Foreign Application Priority Data

May 1, 1982 [JP] Japan ............................ 57-73907

[51] Int. Cl.⁵ .......................................... G08G 1/123
[52] U.S. Cl. .................................. 340/995; 340/990; 364/449
[58] Field of Search ................... 340/995, 988, 990; 364/449, 460; 365/228; 73/178 R

[56] References Cited

U.S. PATENT DOCUMENTS

| 4,084,241 | 4/1978 | Tsumura | 364/460 |
|---|---|---|---|
| 4,104,734 | 8/1978 | Herndon | 365/228 |
| 4,138,726 | 2/1979 | Girault et al. | 340/782 |
| 4,357,593 | 11/1982 | von Tomkewitsch | 340/995 |
| 4,375,086 | 2/1983 | van Velthoven | 365/228 |
| 4,402,050 | 8/1983 | Tagami et al. | 340/995 |
| 4,435,760 | 3/1984 | Kuno et al. | 340/988 |
| 4,490,717 | 12/1984 | Saito | 340/995 |
| 4,535,334 | 8/1985 | Tagami et al. | 340/995 |
| 4,608,656 | 8/1986 | Tanaka et al. | 340/995 |

FOREIGN PATENT DOCUMENTS

2812290 10/1979 Fed. Rep. of Germany ...... 340/995

Primary Examiner—Jin F. Ng
Assistant Examiner—Brent A. Swarthout
Attorney, Agent, or Firm—Irving M. Weiner; Joseph P. Carrier; Pamela S. Burt

[57] ABSTRACT

A current location indicating apparatus for use in an automotive vehicle. The apparatus comprises a current travel distance detection unit adapted to detect a current cumulated travel distance of the vehicle. A bearing detection unit is adapted to detect a current bearing in accordance with current travel. A signal processing unit is adapted to obtain a current locational point in terms of two-dimensional coordinates of the moving vehicle in accordance with the outputs from each of the detection units. A path of travel store unit is adapted to sequentially store the locational data in terms of the two-dimensional coordinates varying from time to time as obtained by the signal processing unit and hold the contents thereof as current continuous locational information on the moving vehicle. Also provided is a microfilm including a series of photographic images of area maps which are prepared in advance for display use, an image pick-up unit adapted to electrically read desired information on an area map from the microfilm, a display unit adapted to visually indicate a map in accordance with the current read-out map information and display with a marking showing the state of travel motion on the same display screen in accordance with the locational data stored in the path of travel store unit, and a manual operating unit adapted to selectively specify an area map desired to be shown on the display screen and properly initialize the marking of indication on the display.

12 Claims, 6 Drawing Sheets

| $X_{11}$ \| $X_{12}$<br>---$X_1$---<br>$X_{13}$ \| $X_{14}$ | $X_{21}$ \| $X_{22}$<br>---$X_2$---<br>$X_{23}$ \| $X_{24}$ | $X_3$ | $X_4$ |
|---|---|---|---|
| $X_{51}$ \| $X_{52}$<br>---$X_5$---<br>$X_{53}$ \| $X_{54}$ | $X_{61}$ \| $X_{62}$<br>---$X_6$---<br>$X_{63}$ \| $X_{64}$ | $X_7$ | $X_8$ |
| $X_9$ | $X_{10}$ | $X_{11}$ | $X_{12}$ |
| $X_{13}$ | $X_{14}$ | $X_{15}$ | $X_{16}$ |

CURRENT LOCATION INDICATION APPARATUS FOR USE IN AN AUTOMOTIVE VEHICLE

This is a continuation of application Ser. No. 07/460,543 filed Jan. 3, 1990, (now abandoned), which is a continuation of application Ser. No. 06/487,589 filed Apr. 22, 1983 (now abandoned).

BACKGROUND OF THE INVENTION

1. Field of the Invention

The present invention relates generally to an apparatus for providing a visual indication of a current location of a mobile craft. More particularly, the invention relates to an improved apparatus having a visual indicating function of a current location of an automotive vehicle or the like for providing a visual display of combined information, such as a current travel status of the vehicle in terms of a current location, a path of travel, a travel direction, etc., for the driver or operator of the vehicle.

2. Description of Relevant Art

In order to prevent the driver or operator of an automotive vehicle or the like from losing his way when driving at night or in unfamiliar surroundings away from his desired route of travel, there have been proposed a variety of apparatus which are specifically designed to provide the driver with suitable ready guidance relating to the vehicle's current status of travel with reference to the desired course of travel, from time to time during travel, by continuously or discretely indicating a due current position or similar information on the vehicle by way of an indication panel or display screen including a related road map or the like disposed at the driver's seat.

In a typical construction of the conventional apparatus for visually indicating a current location of an automotive vehicle for use in such application, a current travel distance of a vehicle is detected by way of distance detecting means in accordance with the vehicle's current travel speed and time of travel, a current bearing and a current quantity of azimuthal deviation of the vehicle are detected by bearing detecting means, and a current location of the vehicle along its travel route is obtained from arithmetical operation on the basis of the thus-obtained route detection data. The result of such arithmetic operation is stored for visual indication on a display in the form of spot information, which varies from time to time during travel of the vehicle, on a display screen on which there is placed in advance a suitable road map such as printed on a transparent sheet or the like. A comparative review of the thus-indicated visual information and the geographical indication by way of the map sheet is thus permitted, so that the driver of the vehicle may visually confirm the current location of the vehicle along its travel route.

With such a typical construction of the apparatus for use as mentioned above, however, it is commonly required that, in order to obtain a due locational guidance with reference to the current location of an automotive vehicle, the driver of the vehicle must take the trouble of selecting in advance a proper sheet from a plurality of prepared local maps which includes a correct area of travel desired by the operator of the vehicle, so as to be placed in position on the surface of the display. Further, such a map sheet set upon the display screen is likely to randomly shift from its due position during travel of the vehicle due to vibrations, turning motion, etc., which are likely to be frequently encountered during the vehicle's travel. Thus, the map sheet is likely to prove to be awkward and troublesome for the driver or operator.

The present invention effectively overcomes the aforesaid inconveniences and difficulties experienced in selecting and setting one of a set of local area maps as printed on the transparent sheets and to be set upon the display screen in the conventional location detecting apparatus for use in an automotive vehicle.

SUMMARY OF THE INVENTION

The present invention provides an improved current location indicating apparatus having an advantageous useful function for use in an automotive vehicle, wherein a series of local area maps of an extended area are preliminarily photographed on a microfilm, which is stored in the form of a photographic image collection, so as to be subsequently readable for direct visual indication on display of a desired area map. The troublesome job of selecting from a bulky set of local area maps and placing a selected one upon the display screen prior to the start of travel is thus eliminated.

According to the present invention, there is provided an improved current location indicating apparatus for use in an automotive vehicle. The apparatus comprises: a current travel distance detection unit adapted to detect a current cumulated travel distance of the automotive vehicle; a bearing detection unit adapted to detect a current bearing or heading of the vehicle in accordance with the current travel motion of the vehicle; a signal processing unit adapted to obtain a current locational point in terms of two-dimensional coordinates of the moving vehicle in accordance with the outputs from each of the detection units; a path of travel store unit adapted to sequentially store the location data in terms of the two-dimensional coordinates varying from time to time which are obtained by the signal processing unit and hold the contents thereof as current continuous locational information on the moving vehicle; a microfilm including a series of photographic images of area maps which are prepared in advance for display use; an image pick-up unit adapted to electrically read desired information on an area map from the microfilm; a display unit, including a display screen adapted to visually indicate a map or geographic image in accordance with the current read-out map information, and display with a marking which shows the current state of travel motion of the vehicle on the same display screen in accordance with the locational data stored in the path of travel store unit; and a manual operating unit adapted to selectively specify an area map desired to be shown on the display screen of the display unit and properly initialize the marking of indication on the display.

The above and further details, objects and advantages of the present invention will become apparent from the following detailed description thereof, when read in conjunction with the accompanying drawings.

DETAILED DESCRIPTION OF PREFERRED EMBODIMENTS

Figure 1:
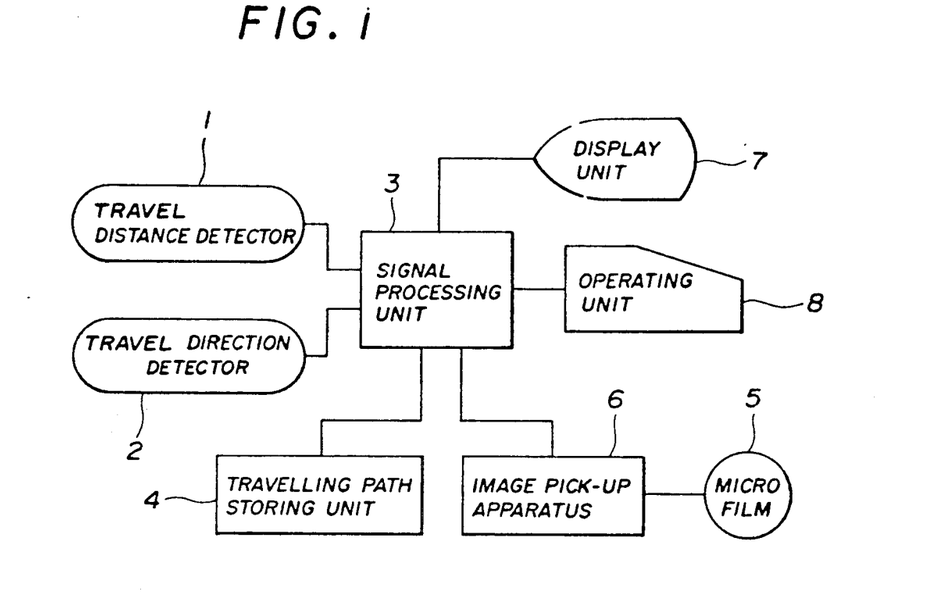
FIG. 1 is a schematic block diagram showing the basic construction of the current location indicating apparatus in accordance with a preferred embodiment of the present invention.

With reference to FIG. 1, there is shown an improved current location indicating apparatus for use in an automotive vehicle according to the present invention. The apparatus comprises, in accordance with a preferred embodiment thereof, a travel distance detection unit 1 adapted to generate an electric pulse signal corresponding to a current travel distance of a vehicle, comprised of a sensor of a photoelectric, electromagnetic or mechanical contact type for producing electric pulses proportional to, for example, a current number of revolutions of a vehicle's wheels. A bearing, azimuth or travel direction detection unit 2 is adapted to output an electric signal which is proportional to a current bearing or a current amount of azimuthal deviation of the vehicle corresponding to a current travel direction thereof as detected by, for example, a rate-type gyroscope which is adapted to detect an angular velocity in the yawing plane. A signal processing unit 3 is adapted to count the electric pulse signals from the distance detection unit 1 so as to measure the current travel distance of the vehicle, determine the current travel direction of the vehicle from the output of the travel direction detection unit 2, and arithmetically operate to obtain current positional data or values in terms of two-dimensional coordinates at an interval of a unit travel distance of the vehicle in accordance with the detection signals from both of the detection units 1 and 2, while controlling the entire apparatus. A path of travel store unit or random access memory (RAM) 4 is adapted to sequentially store data on the discrete positional information in terms of the two-dimensional coordinates which vary from time to time during the travel of the vehicle and are obtained by the signal processing unit 3 as described above, and hold the data as finite and continuous information on the positions corresponding to the current location of the vehicle. Also provided is a microfilm 5 having the desired area map photographically recorded in advance thereon, an image pick-up apparatus or unit 6 adapted to electronically read desired information on a selected area map from the microfilm 5, and a display unit 7 adapted to visually indicate such selected area map in accordance with the thus-read out map information together with the visual marking indication of the current state of travel as updated from time to time following the vehicle's travel, such as on a current location of the vehicle, a current path of travel up to the current location thereof, a current travel direction thereof, etc., in accordance with current cumulated locational data stored in the path of travel store unit 4. A manual operating unit 8 is adapted to give a command of indication to the signal processing unit 3, specify the selection of a desired area map desired to be indicated on the display unit 7, modify an appropriate setting such as of a directional change of the path of travel of the vehicle to be indicated on the display, a shift of the position of such indication, a partially enlarged indication of the road map and the current path of travel, a manual selection of a scale of indication on the display, etc., and also to retrieve the area maps and the vehicle's path of travel to be displayed.

The operation of the above-described construction of the vehicle's current location indicating apparatus according to the present invention will now be described.

In operation, prior to the start-up of the vehicle, the driver or operator of the vehicle specifies a map of a specific area by selecting, for example, a due number thereof upon which he wishes to travel by way of the manual operating unit 8. Upon the selection of a due area map which is desired to be displayed, the signal processing unit 3 operates to read the specified map information from the microfilm 5 so as to deliver the thus-obtained map information to the display unit 7 and visually indicate the particular map of the area required for the vehicle's travel to be shown on the display screen. In such operation, the image pick-up apparatus 6 operates to continuously read the map information on the desired area to be followed by the vehicle, from which the information is constantly ready to be delivered to the display unit 7, whereby any maps as required to be displayed in accordance with the driver's selection can now be ready for indication in succession on the screen of the display unit 7. With respect to access means to a map of a specific area to be displayed on the screen, any suitable means for selecting a required road map for the specific area to be travelled by the vehicle may be adapted, such as by the manual feeding operation of the microfilm 5 under the control of the signal processing unit 3, and also, when so desired, by manual keying operation at the manual operating unit 8, while indicating visually in succession a plurality of area maps as photographically stored on the microfilm 5 so as to select any area maps for travel which are desired to be displayed on the display screen.

Next, it is required as an initialization procedure that marks such as a mark for indicating a current location of the vehicle and a mark for showing a desired direction of travel or heading of the vehicle at the current starting location thereof are indicated respectively on the display screen of the display unit 7, by way of manual keying operation on the operating unit 8. Then, the mark for indicating the current location of the vehicle is to be shifted manually over to the starting point upon the surface of the map shown on the screen by the operator's manual keying operation at the manual operating unit 8. At the same time, the direction indicating mark is to be adjusted in rotation so that it may coincide with the actual direction of the vehicle at the starting point on the display. With such manual adjustment, the initialization procedures of both indication marks are completed.

It will be understood that if the travel direction detector 2 is of a magnetism-compass type which can detect the absolute orientation in itself, it is not necessary to conduct the initialization of the bearing indicating mark as described above.

After such initialization procedures are completed, and when the vehicle starts its travel, the current location indicating apparatus of the invention operates in such a manner that there is delivered a single electric pulse signal at an interval of unit travel distance from the travel distance detector 1 to the signal processing unit 3, where the number of pulses is counted so as to measure a current travel distance of the vehicle, while also sending the output from the travel direction detector 2 to the signal processing unit 3 so as to determine a current travel direction or heading of the vehicle at each moment of the motion of the vehicle. The signal processing unit 3 now operates to arithmetically obtain from time to time a current location or graphic point (x, y) on the X-Y coordinates in the preselected scale of indication on the display screen of the display unit 7 in accordance with the current travel distance and azimuthal deviation of the vehicle which have been detected in the manner described hereinabove, and concurrently the result of such arithmetic operation is fed sequentially to the display unit 7 for visual display thereon, and also to the travelling path store unit 4 so as to be stored therein. The thus-stored content is ready to be read out constantly to be fed into the display unit 7, in succession. At the same time, an azimuthal signal at a current location of the vehicle is sequentially sent out from the signal processing unit 3 to the display unit 7.

Figure 2:
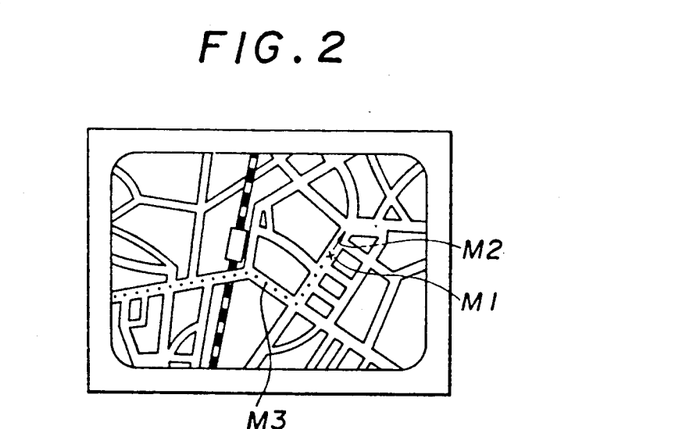
FIG. 2 is a schematic view showing a typical example of a visual indication by way of a local area map shown on the display screen according to the first embodiment of the invention.

More specifically, as typically shown in FIG. 2, these inputs to the display unit 7 from the path of travel store unit 4 and the signal processing unit 3 are adapted to visually indicate on a specific road area map desired for travel therealong on the display unit 7 by way of a mark M1 for indicating a current location of the automotive vehicle, a mark M2 for indicating a current travel direction of the vehicle at the current location thereof, and a mark M3 for indicating the current tracing path of travel of the vehicle from the starting point up to the current location in a simulated tracing fashion, as the vehicle moves along its travel route. In this connection, the current location mark M1 and the bearing indication mark M2 may be combined in such a manner as to provide the current location of the vehicle with a due directivity thereof in itself, so that a combined indication of the current location and the current bearing indication of the vehicle may be obtained, instead of providing separate marks M1 and M2.

Figure 3:
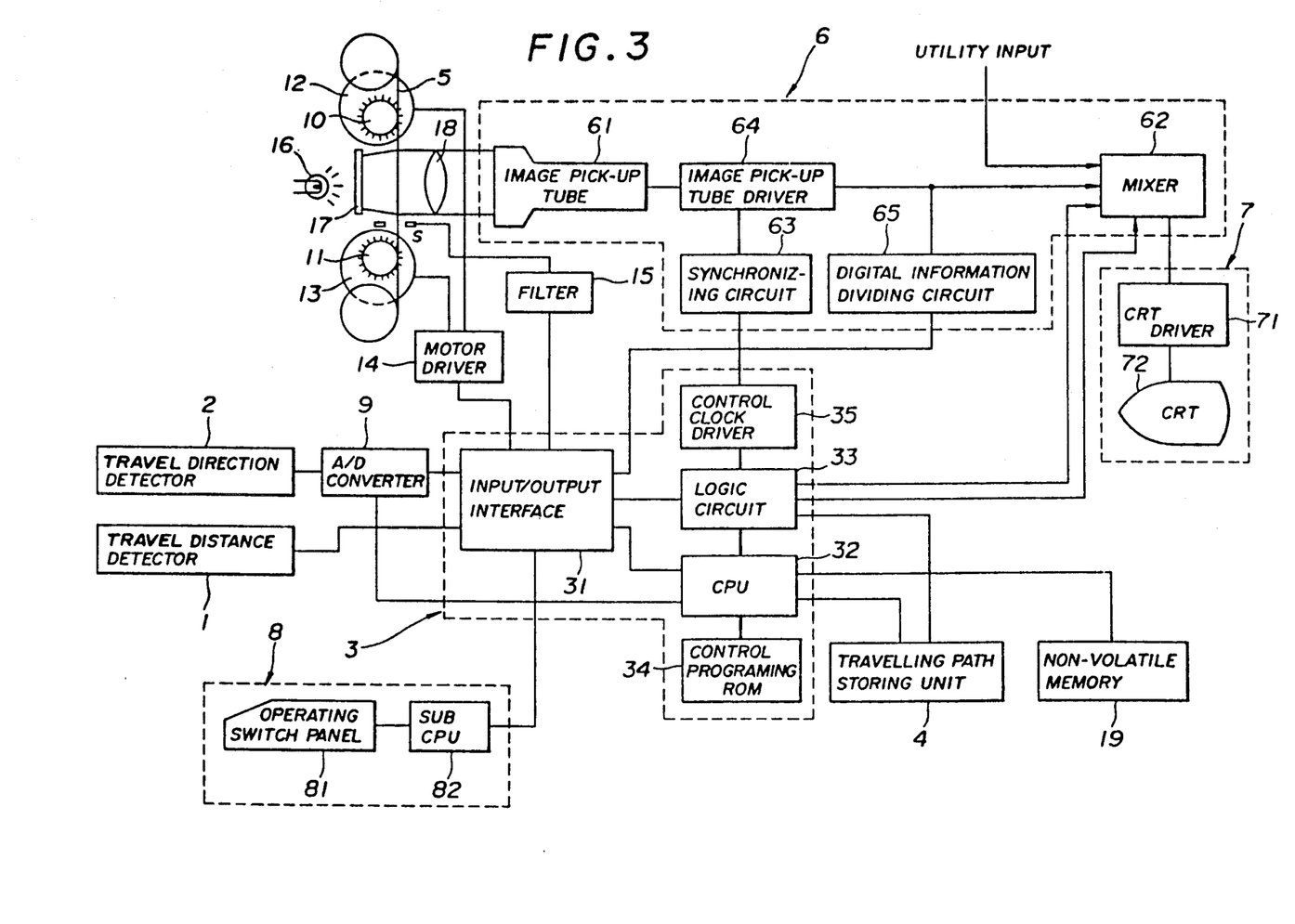
FIG. 3 is a block diagram showing a further detailed construction of the current location indicating apparatus in accordance with a practical construction.

Referring to FIG. 3, there is shown a typical exemplary practical construction of the current location indicating apparatus for use in an automotive vehicle according to the present invention. The signal processing unit 3 as shown in this embodiment comprises an input/output interface 31 which is adapted to receive and transmit the electric signals, a CPU 32 which is adapted to control the central arithmetical operation, a logic circuit 33, a control programming ROM 34 and a control clock driver 35. On the other hand, the rate output from the travel direction detector 2 is converted to a digital signal by way of an A/D converter 9 so that it is read by the CPU 32 through the input/output interface 31, where the current azimuthal deviation varying with the travel motion of the vehicle is detected in sequence. In this construction, the pulse signal output from the travel distance detector 1 is transferred to the CPU 32 through the input/output interface 31, in which the number of pulse signals is counted by the counter so that the travel distance of the vehicle may accordingly be detected in due course as the vehicle travels along. It is to be noted that the operating unit 8 comprises an operating switch panel 81, and a switch encoding sub-CPU 82 which is adapted to read the inputs from the operating switch panel 81 and provide varied command signals to the CPU 32 through the input/output interface 31.

There is also provided a drive mechanism which can be adapted to drive a microfilm 5 which has been prepared in a cassette configuration which contains the plurality of area maps photographed in advance, and feed the microfilm 5 either in the forward or reverse direction, and which can be driven under the control of the CPU 32 so as to access any area map sheet as desired. More specifically, referring to the construction of the drive mechanism, there are provided sprockets 10, 11 adapted to engage the sprocket perforation in the microfilm 5 so as to drive either in the forward or reverse direction, and drive motors 12, 13 adapted to respectively drive the sprockets 10, 11. Each of the drive motors 12, 13 is appropriately driven through a motor driver 14, with a locating sensor S detecting the slits provided in correspondence with each of the area maps stored on the microfilm 5. In FIG. 3, reference numeral 15 designates a filter which is adapted to shape the pulse signal of detection from the locating sensor S. A lamp 16 illuminates from one side of the microfilm 5 at the frame where there is accessed a desired area map therein so that the frame including the desired map may be illuminated through a light diffusing panel 17. A light signal including the thus-illuminated information or picture of area map desired may thus be delivered through an image formation lens 18 to the image pick-up apparatus 6. The image pick-up apparatus 6 is arranged such that the light signal is photoelectrically converted by the image pick-up tube 61 (or a one-dimension or two-dimension type solid-state image pick-up element) so as to electrically read such area map information. Subsequently, the thus-obtained area map information and the data on the current location, heading, and path of travel of the vehicle as delivered from the signal processing unit 3 are mixed appropriately by means of the mixer 62. In accordance with the thus-obtained video signal through mixing, there is visually indicated the area map together with the indication of the current location, heading, and path of travel of the vehicle overlapped on the display screen of a CRT 72 through a CRT driver 71 in the display unit 7. In this connection, therefore, it is now possible in practice that there is shown a scroll operation in the visual indication of such area map, if necessary, as the path of travel of the vehicle proceeds, by way of appropriately feeding the microfilm 5. With regard to the procedure of photoelectrical conversion of the visual information on the area maps by way of the light signal into the electric signal by means of the image pick-up tube 61, the electrical reading of the area map information may be conducted in synchronism with the control clock on the part of the signal processing unit 3 by the aid of the image pick-up tube driver 64.

Figure 4:
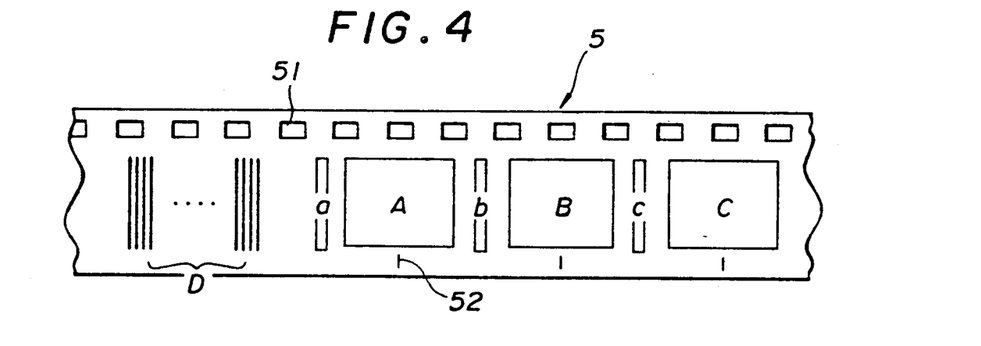
FIG. 4 is a fragmentary view showing in plan a strip of microfilm having several frames in accordance with a preferred embodiment of the invention.

As shown in FIG. 4, a plurality of digitized auxiliary data D are recorded on the microfilm 5 specifically for the purpose of recognizing the existence of the microfilm 5 per se by the signal processing unit 3, so that such data as read at the time of image pick-up may properly be separated by the digital information dividing circuit 65 so as to be transferred to the signal processing unit 3. More specifically, noting that there is required information which should respectively be recognized cassette-by-cassette of the microfilm 5 by the signal processing unit 3, such as the auxiliary data for the purpose of having the microfilm 5 per se recognized, according to the present invention it is advantageously arranged that such auxiliary data D be recorded in digital coded form on part of the microfilm 5 as typically shown in FIG. 4. Thus, such auxiliary data D as identified at the time of imaging may be separated by the digital information dividing circuit 65 shown in FIG. 3 so as to be read out properly by the signal processing unit 3.

Figure 5:
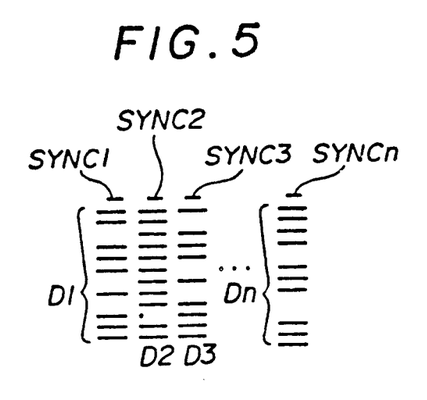
FIG. 5 is a schematic view showing the detail of a set of auxiliary data as recorded upon the microfilm.

At the same time, there are respectively provided one of sampling synchronous bits SYNC1 through SYNCn in each of the data D1 through Dn which are individually coded as shown in FIG. 5, so that each of the video signals from the auxiliary data D taken at the time of image pick-up may be delivered in synchronism with each of the sampling synchronous bit signals, so as to be provided accordingly to the signal processing unit 3 through a waveform shaping circuit (not shown). Furthermore, as typically shown in FIG. 4, locating information a, b, c, ... are recorded for each of the area map sections A, B, C, ... on the microfilm 5, so that the due recognition of a specific area map along which the vehicle is scheduled to travel as indicated on the screen of the display unit 7 may be readily made. In this connection, reference numeral 51 designates the sprocket holes for the proper feed of the microfilm, and reference numeral 52 designates the slits for detecting the proper location in correspondence with each of the area map sections A, B, C, ... , respectively.

Further to the microfilm system including the visual area map information, the signal processing unit 3 which reads out the required auxiliary data D from the microfilm 5 operates to have an index indication of the desired area map among the image collection of the microfilm 5 presented on the display screen in accordance with the thus-obtained auxiliary data A, so that it may ascertain if the area map for the desired area to be travelled by the vehicle is included in the image collection of the microfilm 5 or not. It can also be arranged such that the system may check whether or not a different microfilm cassette having some other cassette number held in the non-volatile memory 19 is loaded in the system, or check if no due film cassette has been loaded yet. If not, the signal processing unit 3 may detect such situation, and may present a visual message to advise the operator to load the required film cassette on the screen of the display unit 7.

According to such specific arrangement of the present invention wherein any information that should be taken by the signal processing unit 3 for each of the cassette frames of the microfilm 5 are recorded as the auxiliary data D which is digital coded on a part of the microfilm 5, and are photoelectrically imaged to be read electrically by the signal processing unit 3, it is advantageous that such auxiliary data D may accordingly be recorded with a high freedom from the configuration of the film cassettes, and from restrictions in data formatting and processing, and also without any necessity of the use of an ROM or the like for the purpose of identification of a desired film cassette. Moreover, it is possible that any auxiliary data D may be recorded at any part of the microfilm 5, and also it will be readily understood that there is loaded a different film cassette from the previous one when reloading, which may be detected without rewinding the microfilm roll to the point where the correct area map is stored.

Figure 6:
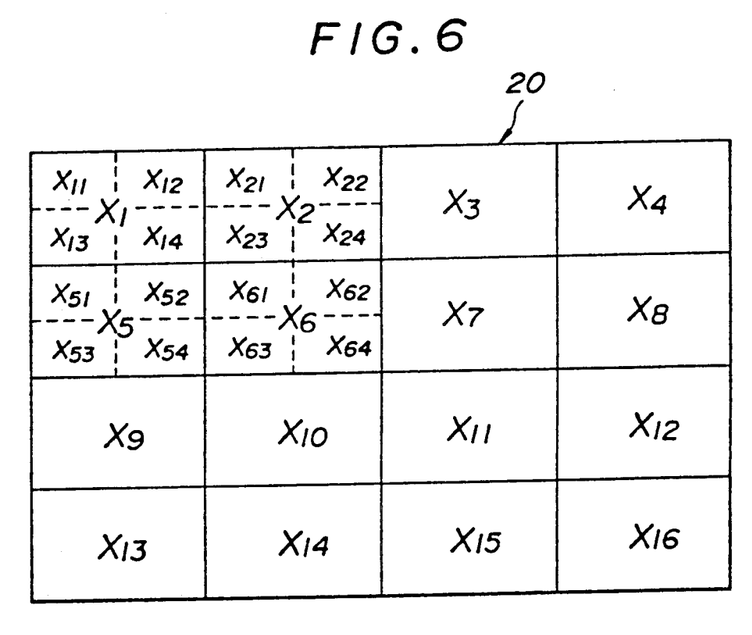
FIG. 6 is a schematic diagram showing the general construction of block divisions and subdivisions taken from a large area map of a specific area to be visually displayed on the display screen.

Also, according to the present invention, when a global map for a specific area is photographed on the microfilm 5, as shown for example in FIG. 6, such global map for a desired area 20 is first divided into a plurality of divided blocks $X_1$ through $X_{16}$ of an equal area which are arranged in a matrix manner, each of which blocks $X_1$ through $X_{16}$ covers an individual sectional area map photographed on the same diminishing scale upon the microfilm 5, respectively. With such construction, each of such divided unit area maps in the matrix blocks $X_1$ through $X_{16}$ is to be accessed for the visual display. Furthermore, when a selected area map 20 includes a town consisting of, for example, the blocks $X_1$, $X_2$, $X_5$ and $X_6$, where there are many complicated streets and roads, it is conveniently arranged such that each of the area maps of these blocks $X_1$, $X_2$, $X_5$ and $X_6$ is further divided into four equal sub-blocks $x_{11}$ through $x_{14}$, $x_{21}$ through $x_{24}$, $x_{51}$ through $x_{54}$, and $x_{61}$ through $x_{64}$, respectively, with the area map in these sub-blocks being individually photographically recorded per one sub-block on the same enlarging scale (i.e., a reduction in the diminishing scale) on the microfilm 5. When one wishes to review the area map on the subdivided scale on the display, each of such subdivided area maps may be accessed sub-block by sub-block so as to be displayed with such details on the display screen.

Figure 7A:
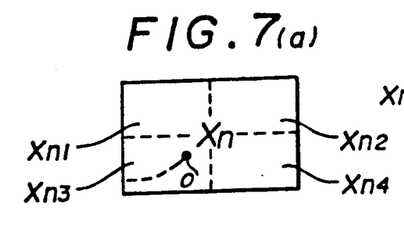
FIG. 7(a) is a view showing an example of divided visual indication of a current location of a vehicle to be displayed by way of one of multiple divisional blocks on a small scale.
Figure 7B:
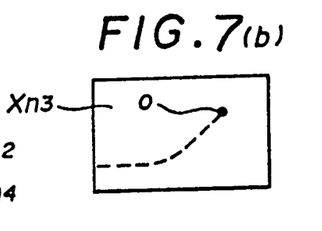
FIG. 7(b) is a view similar to FIG. 7(a), showing the current location of a vehicle by way of one of the divisional blocks of indication of FIG. 7(a).

By virtue of such construction of the current location display apparatus for use in an automotive vehicle according to the present invention, which incorporates the microfilm 5 wherein there is included a specific city or town which consists of many subdivided blocks of areas taken on an enlarged scale in accordance with the degree of complexity, it is advantageous that when a current location of the vehicle is now in one of the blocks $X_1$, $X_2$, $X_5$ and $X_6$ of a city area with crowded streets or roads, one of the blockwise area maps or one of the sub-blockwise area maps may be selectively displayed on the display screen. In this connection, when photographically picking-up the global map 20 of a specific area by dividing it into a plurality of blocks on the microfilm 5, there are added certain digital data to note that a multiple scale is available for each of the area maps corresponding to the blocks $X_1$, $X_2$, $X_5$ and $X_6$ upon the microfilm 5, so that the signal processing unit 3 may read such digital data at the time of access to each of the blocks $X_1$, $X_2$, $X_5$ and $X_6$ of such area maps, so as to advise the operator of the vehicle of the notice (by way of either visual or acoustic indication) as to the possibility that an area map currently on display may be presented on a diminishing scale. When a command for changing the scale factor on the display is made by the operator from the operating unit 8 in accordance with such notice, in response to such command the signal processing unit 3 determines to select an area of indication, for instance, at the current point 0 of the vehicle in the block $X_n$ (n equals 1, 2 5 or 6) of the area map as shown in FIG. 7(a). According to this determination, it may now access the specific area map of a sub-block $x_{n3}$ of a further reduced scale which corresponds to that area to be indicated so as to be displayed accordingly, with the automatic shifting of the subject of indication as shown in FIG. 7(b). When the scene on display is shifted from the area map corresponding to the block $X_n$ to the sub-block $x_{n3}$ with the further reduced scale of indication, it will be understood that there is also shifted accordingly the setting of the current location as well as the current path of travel of the vehicle by the signal processing unit 3 in accordance with this change in the scale of indication. Also, when the vehicle proceeds in its travel so that the current location of the vehicle moves out of the area of the block $X_n$ having the multiple scale on display, the signal processing unit 3 recognizes such condition and then shifts the scale of indication on display down to the previous one, while providing a visual or acoustic indication, and at the same time continues to present on the display screen the current travel state of the vehicle upon the area map of the particular block where it is currently located.

In this manner, by virtue of the unique construction of the current location indication apparatus according to the present invention wherein there is incorporated the microfilm system which features the further inclusion of the plurality of subdivided blocks of areas having the enlarged scale of indication, particularly for the town area which consists of a complex of streets and roads, there is advantageously provided a versatile dual display system which is selectively shiftable in accordance with the conditions particular to an area in which the vehicle travels. There is presented a relatively high scale of indication in accordance with the normal blockwise division of an area map which covers a relatively wide range of area for a relatively wide extension of guidance on display when in an area of relatively simple road patterns such as one including an expressway, while there is selectively presented a relatively reduced scale of indication on the basis of the sub-blocks of an area map which covers a relatively small area of guidance with high detail when travel is to proceed in an area of complex streets and roads, such as a town.

Further, according to the construction of the embodiment of the invention shown in FIG. 3, there is conveniently provided the non-volatile memory 19 which is specifically designed for the back-up purpose of maintaining minimum information from being lost in such an event that the power supply to the complete system is cut by the shutting-off of the ignition switch of the automotive vehicle while it is stopped along the course of travel, which information is protected to such an extent that is required for the resumption of indication on the display that has been accumulated up to the moment of such shut-down of the power source, when the vehicle is restarted. The extent of such minimum information required for the maintenance in storage at the non-volatile memory 19 at the time of such power-down is, for instance, the film cassette number currently in use for display, the map number currently in use for display, the current scale of indication on display, the data in terms of the coordinates relating to the current location, the direction of travel, the latest portion (2 to 3 cm in segment) of the accumulated path of travel up to the current location of the vehicle on the display, and also the guide markings if so indicated by way of the operating unit 8 along with the current path of travel of the vehicle. In such a situation, when the system is powered-up at the time of resumption of travel, the signal processing unit 3 now operates first to read the stored contents from the non-volatile memory 19 and to have the same contents of information required for the visual display as that held at the time of power-down displayed on the screen, so that it may immediately be ready to resume the visual indication relating to the current location of the vehicle as it restarts its travel. At this moment, the system checks, when the power supply is restored, whether there is loaded a different microfilm cassette having a different cassette number or not, or if no film cassette is loaded. If not, the signal processing unit 3 detects same and may indicate a command to the effect that the desired film cassette be loaded on the display screen of the display unit 7.

Figure 8A:
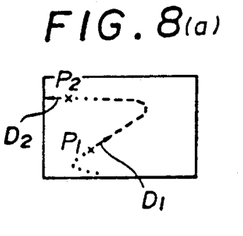
FIGS. 8(a) and (b) are views showing the state of travel of a vehicle occurring during power-off of the present system.
Figure 8B:
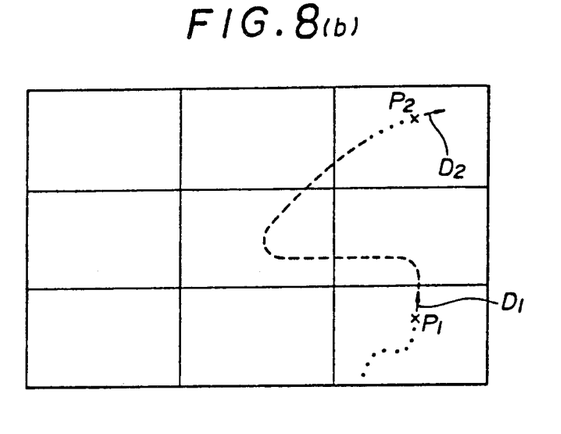

Incidentally, there may possibly arise a situation in which the vehicle is moved during the power-down state. In such a situation, however, according to the construction of the current location indicating apparatus as described hereinabove, the data left stored by the non-volatile memory 19 at the time of such power-down may become obsolete, because it is not updated for the passage from the previous point of stopping over to a new starting point which has been moved to during the power-down period. Under such condition, when the power supply to the system is restored so that the display of a current location of the vehicle is resumed on the basis of the previous data read from the non-volatile memory 19, as typically shown in FIG. 8(a), there is an undesired result inasmuch as the previous current location P1 and the previous direction of heading D1 of the vehicle are shown, which apparently differ from an actual current location P2 and an actual current heading D2 of the vehicle, thus resulting in misleading guidance for subsequent travel of the vehicle. In the case that the vehicle is moved over an area which corresponds to a plurality of area maps as shown in FIG. 8(b), it is very possible that not only improper indication of the current location P1 and current direction of heading D1 of the vehicle, but also of an incorrect area map or maps may be made on the display.

In this respect, according to the present invention there is provided means for overcoming the problems encountered in a movement of the vehicle during the power-down state with an advantageous construction in which there is provided means for detecting, for instance, the state of combustion in the engine of the vehicle and for automatically performing data collection on the movement state of the vehicle so as to have the latest data stored continuously in correspondence with the state of vehicle movement. With such arrangement, it is advantageous that when the display of a current location of the vehicle is desired to be resumed, such data may immediately serve to resume the due display on the current location of the vehicle. As an efficient means for detecting the complete combustion state of the vehicle's engine, there may be provided an AND state between the switch-on signal from the ignition switch of the vehicle and the charging signal from the ignition capacitor in the engine ignition system. Also, as a useful means for back-up in the detection of a complete combustion state of the engine, all devices other than the display unit 7 are forced to be powered-on by using a sub-CPU (not shown) which is particularly adapted for use when detecting the state of complete combustion. The signal processing unit 3 is thereby caused to read any necessary data from the non-volatile memory 19, and to have the current location of the vehicle calculated which changes from time to time in accordance with each of such detecting signals as fed from the travel distance detector 1 and the travel direction detector 2; and when there is a shift on display with respect to the current location and current direction of heading, the latest path of travel up to the current location of the vehicle, and a shift of an area map where the vehicle proceeds during travel, to have the contents of the non-volatile memory 19 relating to the data on the number of such a shifted area map updated sequentially. Thereafter, at the moment that the power switch for the system is turned on, so that there is a normal power-on state of the entire system, then the signal processing unit 3 operates to read the current contents of storage at the non-volatile memory 19 so as to be displayed on the screen of the display unit 7, and consequently, there is presented the normal processing in reflection of the current state of travel of the vehicle as it proceeds with its travel, thus providing a continuous indication on the current location of the vehicle.

According to the advantageous features of the current location indicating apparatus of the present invention, it is arranged that the state of motion of the vehicle is detected by way of the current state of complete combustion during the state of power-off of the entire system, thereupon performing the back-up processing in reflection of the current state of motion of the vehicle so as to continuously have the latest data on the current location stored at the non-volatile memory 19, and subsequently at the time of restoration of the power supply to the system, providing the correct indication of the current location of the vehicle so that due guidance may be effected.

Referring to FIG. 3, mixer 62 is adapted to present a desired visual indication on the screen of the display unit 7, as it is put into operation by a shifting signal from the signal processing unit 3 under a command from the operating unit 8, so that it may present any desired telecasting program or other utility services.

Figure 9:
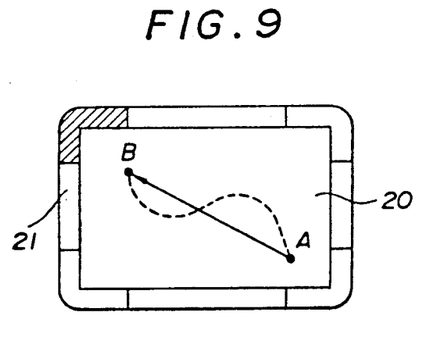
FIG. 9 is a schematic view showing the general manner in which the current bearing or heading of a vehicle is shown toward the destination thereof.

In accordance with the advantageous construction of the current location indicating apparatus of the present invention, it is possible to optionally set a marking such as a starting point and a destination point by key-in at the operating unit 8, and also the signal processing unit 3 may determine the direction to a destination viewed from a starting point as set accordingly by way of such starting point and destination, as schematically shown in FIG. 9. Thus, an approximating indication of direction toward the destination in an area existing out of the area of indication 20 on the area map currently shown on the display may be presented. More specifically, there is provided an area of direction indication 21 as presented in one of the edge spaces divided into eight divisions located around the display area 20, which one area of indicating direction lying in correspondence with a direction viewed from a starting point A toward a destination B may accordingly be lit, so that the operator of the vehicle may visually take an approximated direction toward the desired destination.

Figure 10:
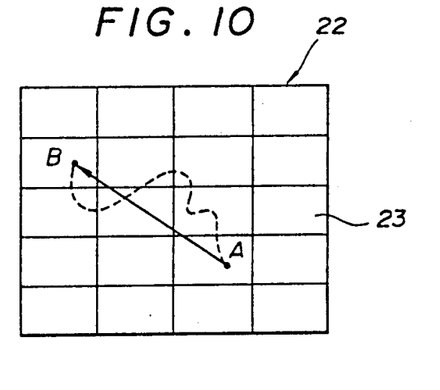
FIG. 10 is a schematic view showing the manner of division of a large area map into a plurality of local area maps.

More specifically, such advantageous process of approximating the direction toward a destination is adaptable to not only the case of a single map currently presented on the display but also to such a case, as typically shown in FIG. 10, that there is too long of a distance from a starting point A to a destination B to be shown in a single area map, so that it is required to show a plurality of area maps one after another on the display. In this case, the presentation of direction may be made in a step-by-step fashion by shifting from one area over to another in sequence.

Figure 11A:
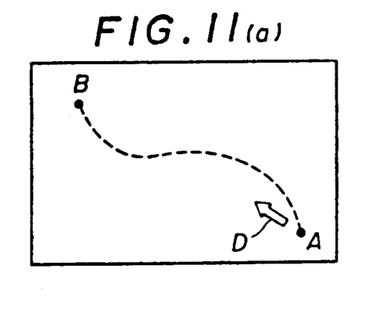
FIGS. 11(a) and (b) are views showing the general manner of indication of a current heading of a vehicle toward its target point.
Figure 11B:
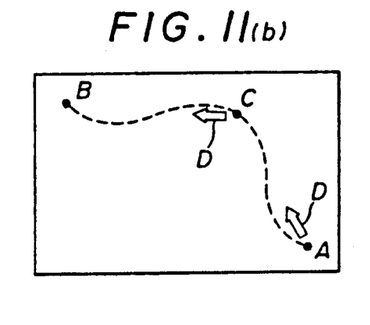

Also, in addition to the optional setting of the markings for the starting point and the destination of the travel to be followed by the vehicle by a key-in at the operating unit 8, there may be shown a marking for the indication of a selected path of travel through a preselected passing point on way to the destination, as desired. It is further possible to arrange that the signal processing unit 3 may detect not only a direction toward the destination and/or a preselected point or points of passing on way to the destination as viewed from the starting point judging from the state of setting marks for the starting point, the destination and/or any of the points of passing, but also a tentative direction toward a next point of passing and/or the destination as viewed from a previous point of passing, so that there may be presented an approximated direction by way of an arrow D at or near the starting point and/or one of the points of passing on way to the destination on the area map as shown on the display screen, as schematically shown in FIGS. 11(a) and 11(b), respectively. In FIGS. 11(a) and 11(b), the starting point is designated at A, the destination at B, and one of the passing points at C. The signal processing unit 3 has an internal memory which is adapted to store the arrows D of each direction divided into several segments, and which is arranged such that the signal processing unit 3 may read a suitable data in accordance with the condition of determination for a direction toward the destination as described hereinabove, so that an appropriate indication of arrow D may be presented on the screen of the display unit 7. In practical use, it will suffice to have eight arrows D with the approximated headings of up and down, right and left, and diagonal toward the destination.

Figure 12:
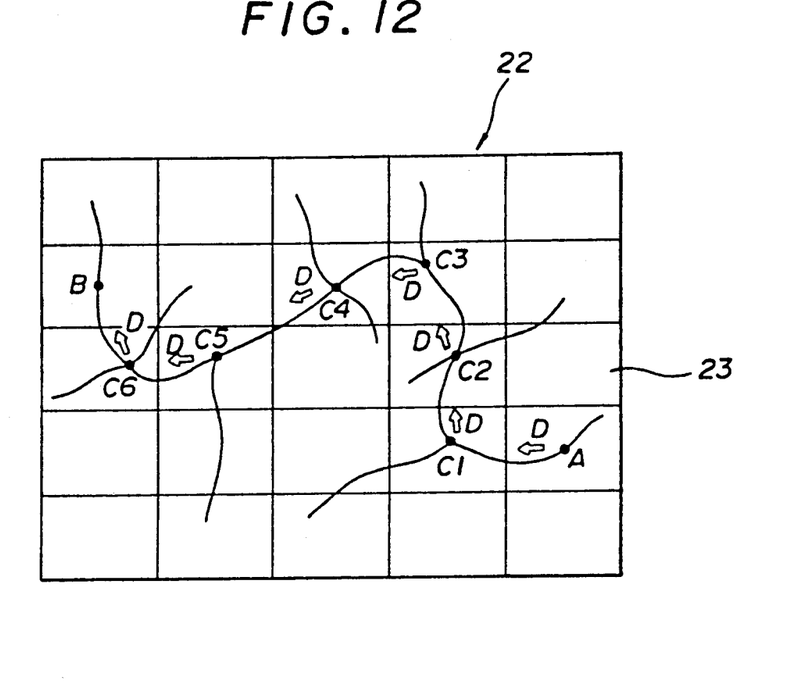
FIG. 12 is a general view showing the manner of division of a large area map into a plurality of local area maps.

In addition, it is further arranged according to the invention that such approximated indication of a direction toward the destination of the vehicle's travel may be adapted not only to a single area map currently shown on the display, but also to a greater area which covers a relatively long distance from the starting point A toward the destination B and which would require a plurality of area maps to cover. In such a case, there may likewise be presented a series of area maps one after another including the approximated indication of direction toward the far-distanced destination. In consideration of such advantageous features as attained in the present invention, even when a plurality of area maps are required to be displayed in succession for a due guidance of a relatively long coverage of several areas, as schematically shown in FIG. 12, it may accordingly provide a step-by-step representation of one after another of destinations with the short-sighted indication of an area to be displayed in sequence, so that it is possible to smoothly attain the full tracing of the vehicle toward the desired destination. Referring to FIG. 12, there are shown several predetermined points C1 through C6, which may be made checking points for a desired path of travel to be followed by the vehicle, respectively.

Incidentally, when several pieces of area maps are required to be photographically recorded on the microfilm 5, a global area map 22 for covering a specific large area is divided in a regular matrix fashion into a plurality of divisional maps 23 as shown in FIGS. 10 and 12, so that the thus-obtained divisional maps may successively be picked-up in a given sequence on the microfilm 5 as shown by A, B, C, ... (FIG. 4). In accordance with such arrangement, if each of such divisional maps 23 which relates to a desired area of travel is selected with a given priority of access in accordance with a given input command from the operating unit 8, the signal processing unit 3 now operates to read this input data in that sequence to be stored by its internal memory, so that as the vehicle starts travelling and proceeds in its travel, there may be presented each of such divisional area maps 23 on the display screen to be shifted in accordance with that given sequence.

Figure 13:
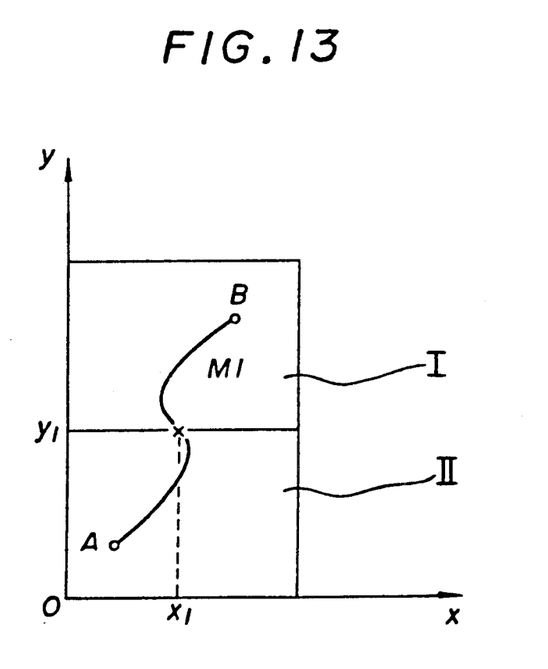
FIG. 13 is an explanatory view showing the manner of shifting the coordinates taken when shifting from one to another of adjacent local area maps displayed on the screen.

More specifically, supposing that there occurs a shift from one divisional map I to another II (FIG. 13) on the screen of the display unit as the vehicle proceeds with its current location designated at the mark M1 moving on the screen accordingly, the signal processing unit 3 operates to appropriately shift the current representation of the adjacent divisional area maps in terms of the coordinates, thus continuously presenting the current location of the vehicle from a new position of representation after the shifting of these adjacent divisional maps. Referring to the case shown in FIG. 13, with a due shift of the coordinates from the point (0, y1) to the point (0, 0), the position of the current location indicating mark M1 on the border between the divisions I and II and is now shifted from the point (x1, y1) to the point (x1, 0), without any deviation in the display upon the shift of the divisional maps, so that a due current location may be presented continuously in the shifting of these divisional maps I and II free from any risk of misguidance on an incorrect road. When presenting the current location of the vehicle with a plurality of adjacent divisional maps shifting one after another, instead of giving a consistent manner of directional indication from the starting point A to the destination B, there may be respectively presented an appropriate mark (not shown) indicating each of several check points on way of a current scheduled path of travel to be followed by the vehicle on each of the divisional area maps 23 to be shown on the display screen in accordance with the command given from the operating unit 8, so that an approximated indication of a current direction may be sequentially given upon each of such shiftings of the divisional area maps 23 on the display, thus providing a step-by-step guidance toward the desired destination through each of these check points.

Figure 14:
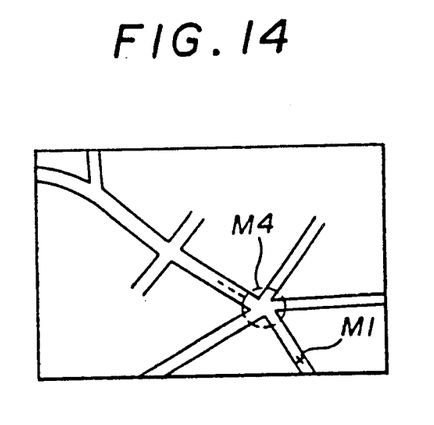
FIG. 14 is a schematic view showing a marking for a point of reservation of the heading of a vehicle as set on a branched road displayed on the screen.

Further to the current location indicating apparatus in accordance with the present invention, a bearing reservation point mark M4, as shown in FIG. 14, may be presented appropriately at several main crossing points and the like on way of a scheduled path of travel to be followed by the vehicle on the representation of a map on the display through the signal processing unit 3 which is so operated from an optional input to the operating unit 8.

Figure 15A:
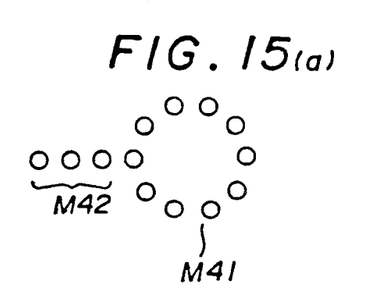
FIGS. 15(a) and (b) are schematic views showing markings of reservation point with the heading of a vehicle.
Figure 15B:
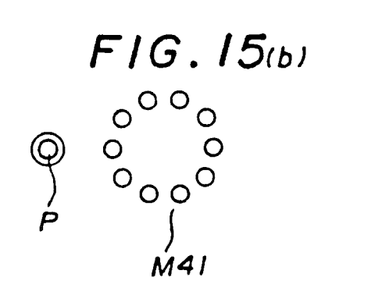

More specifically, as shown in FIG. 15(a), this bearing reservation point mark M4 consists of a mark section M41 for indicating the location of a passing point on way of the scheduled path of travel and a mark section M42 for indicating a direction to be taken by the vehicle at that passing point, which is a convenient and useful means to provide the operator of the vehicle with a positive guidance with respect to a correct path of travel to be selected at a crossing point of a complex configuration which consists of a plurality of branches where the operator might get lost in his selection of a correct route to be taken. More specifically, it is arranged that data concerning the mark section M41 and relating to the mark section M42 in terms of a plurality of divisional sectors of the complete 360° orientation are stored in the internal memory of the signal processing unit 3, respectively. There may thus be presented on the display unit 7, in combination, one of the data of the mark section M41 and one of those of the bearing mark section M42 as selectively read in accordance with each of the commands for a bearing reservation point of location and direction inputted from the operating unit 8. In this connection, there may alternatively be presented a blinking of a point P for a directed bearing instead of the bearing indicating mark section M42, as shown schematically in FIG. 15(b). Also, according to the configuration of a crossing on way of the scheduled path of travel, there may arise the case that it is not required to indicate the selection of a route at a crossing, and only a setting of the location thereof will suffice. In this case, only the mark section M41 may be indicated with the selective operation at the operating unit 8.

By virtue of the construction of the current location indicating apparatus of the invention, wherein a desired marking indication may in advance be put with respect to a bearing reservation for any point of crossing or the like en route along the scheduled path of travel to be followed by the vehicle, an appropriate reservation of a check point may optionally be made on the representation of an area map on the display, and with a ready guidance for a correct selection of a path of travel at a crossing having complex branches.

Figure 16:
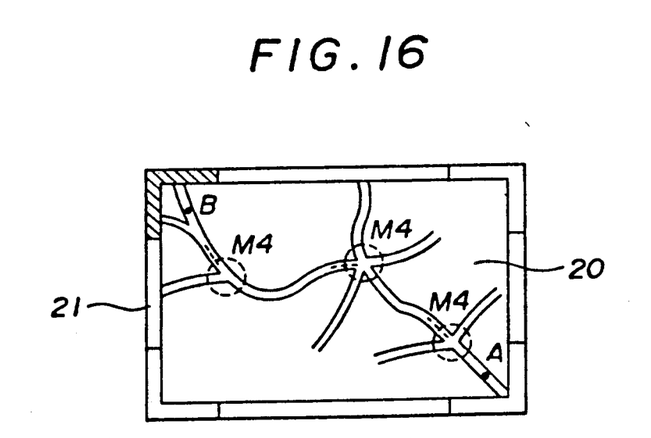
FIG. 16 is a view showing an example of visual indication on the display wherein a current heading indication toward the destination of a vehicle is displayed together with the indication of a current heading reservation point on the display screen.

Further to this arrangement, for instance, as generally shown in FIG. 16, in addition to the marking of the starting point A and the destination B upon an area map 20 currently on the display with a key-in of a command at the operating unit 8, the signal processing unit 3 may determine the bearing of the destination B as viewed from the starting point A to have a suitable one of the eight bearing indication areas 21 disposed around the area map 20 on display illuminated so as to give a general guidance in the indication of a directed bearing to be followed by the vehicle. With such a combined arrangement, there is assured an optimal guidance with convenience in the determination of a suitable bearing during the travel of the vehicle with the long-sighted and general bearing indication toward the desired destination on the one hand, and with the relatively short-sighted outlook in the bearing detection by the employment of the bearing reservation point marking M4 on the other hand.

As fully described hereinabove, by virtue of the unique construction of the current location indicating apparatus according to the present invention, which provides the ready presentation of a desired area map for the scheduled travel of the vehicle on demand together with the updated and continued representation of the current state of travel, free from any troublesome manipulation of a physical sheet of area map selected from a set of maps prepared beforehand, it is advantageous that it may assuredly present the current state of travel of the vehicle immediately on the area map without any undesired parallax, together with ready operability by virtue of the automatic selection of a desired area map to be displayed with the mere application of an access command. Also, by virtue of the use of the microfilm as the source of map information, there is provided a variety of advantages such as that the map information may be stored efficiently and may be readily prepared, and further that because the area maps per se are photographically recorded immediately on the microfilm and the thus-prepared maps are read electrically so as to be reproduced as photo images, a high resolving power of maps on the display is assured.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A current location indicating apparatus for use in an automotive vehicle, comprising:

current travel distance detection means for detecting a current cumulated travel distance of said automotive vehicle;

bearing detection means for detecting a current bearing or heading of said vehicle in accordance with a current traveling motion of said vehicle;

signal processing means for obtaining a current location point in terms of two-dimensional coordinates of the moving vehicle in accordance with the outputs from each of said detection means;

path of travel store means for sequentially storing the locational data in terms of the two-dimensional coordinates varying from time to time which are obtained by said signal processing means and holding the contents thereof as current continuous locational information on the moving vehicle;

image storing means including a series of photographic images of area maps which are prepared in advance for display use;

image pick-up means for electrically reading desired information on an area map from said image storing means;

display means including a display screen for visually indicating a map in accordance with the current read-out map information and displaying a marking showing the current state of travel motion of said vehicle on said display screen, including a current location of the vehicle, a current travel direction of the vehicle at the current location thereof and a current tracing path of travel up to the current location thereof, in accordance with the locational data stored in said path of travel store means;

manual operating means for selectively specifying an area map desired to be shown on said display screen of said display means and initializing said marking on the display screen;

predetermined portions of said area maps of said image storing means being recorded with different scales so that the map images may selectively be presented on said display screen in a desired sequence in accordance with the recorded map information as read by said image pick-up means, together with the current location indication of said vehicle, and in accordance with said different scales;

means for indicating to a driver when the vehicle is in the vicinity of said predetermined portions of said area maps, and adapted to present a different map scale on said display screen in accordance with a given operating command;

said means for indicating including digital data read by said image pick-up means in said predetermined portions of said area maps when said current location indication of said vehicle is in the vicinity of said predetermined portions;

setting means for setting a starting point and desired destination of said vehicle, respectively, on said display screen from an optional operating command; and a plurality of sectioned indicating means disposed adjacent to and around substantially the entire periphery of said display screen in a divided frame fashion to indicate the up-and-down, the right-and-left, and the diagonal directions, respectively, and adapted to present an approximated indication of direction of said destination in accordance with a given operating command.

2. A current location indicating apparatus for use in an automotive vehicle, comprising:

current travel distance detection means for detecting a current cumulated travel distance of said automotive vehicle;

bearing detection means for detecting a current bearing or heading of said vehicle in accordance with a current traveling motion of said vehicle;

signal processing means for obtaining a current locational point in terms of two-dimensional coordinates of the moving vehicle in accordance with the outputs from each of said detection means;

path of travel store means for sequentially storing the locational data in terms of the two-dimensional coordinates varying from time to time which are obtained by said signal processing means and holding the contents thereof as current continuous locational information on the moving vehicle;

image storing means including a series of photographic images of area maps which are prepared in advance for display use;

image pick-up means for electrically reading desired information on an area map from said image storage means;

display means including a display screen for visually indicating a map in accordance with the current read-out map information and displaying a marking showing the current state of travel motion of said vehicle on said display screen, including a current location of the vehicle, a current travel direction of the vehicle at the current location thereof and a current tracing path of travel up to the current location thereof, in accordance with the locational data stored in said path of travel store means;

manual operating means for selectively specifying an area map desired to be shown on said display screen of said display means and initializing said marking on the display screen;

predetermined portions of said area maps of said image storing means being recorded with different scales so that the map images may selectively be presented on said display screen in a desired sequence in accordance with the recorded map information as read by said image pick-up means, together with the current location indication of said vehicle, and in accordance with said different scales;

means for indicating to a driver when the vehicle is in the vicinity of said predetermined portions of said area maps, and adapted to present a different map scale on said display screen in accordance with a given operating command;

said means for indicating including digital data read by said image pick-up means in said predetermined portions of said area maps when said current location indication of said vehicle is in the vicinity of said predetermined portions;

setting means for respectively setting a starting point and at least one destination on said display screen; and bearing indicating means for detecting an orientation as viewed from said starting point toward said destination, and that as viewed from one preset destination on way of the travel path of said vehicle toward another, in presenting an approximated indication of said orientation with an arrow directed towards said destination at the place of said staring point and said one preset destination in accordance with a given operating command.

3. A current location indicating apparatus for use in an automotive vehicle, comprising:

current travel distance detection means for detecting a current cumulated travel distance of said automotive vehicle;

bearing detection means for detecting a current bearing or heading of said vehicle in accordance with a current traveling motion of said vehicle;

signal processing means for obtaining a current locational point in terms of two-dimensional coordinates of the moving vehicle in accordance with the outputs from each of said detection means;

path of travel store means for sequentially storing the locational data in terms of the two-dimensional coordinates varying from time to time which are obtained by said signal processing means and holding the contents thereof as current continuous locational information on the moving vehicle;

image storing means including a series of photographic images of area maps which are prepared in advance for display use;

image pick-up means for electrically reading desired information on an area map from said image storing means;

display means including a display screen for visually indicating a map in accordance with the current read-out map information and displaying a marking showing the current state of travel motion of said vehicle on said display screen, including a current location of the vehicle, a current travel direction of the vehicle at the current location thereof and a current tracing path of travel up to the current location thereof, in accordance with the locational data stored in said path of travel store means;

manual operating means for selectively specifying an area map desired to be shown on said display screen of said display means and initializing said marking on the display screen;

predetermined portions of said area maps of said image storing means being recorded with different scales so that the map images may selectively be presented on said display screen in a desired sequence in accordance with the recorded map information as read by said image pick-up means, together with the current location indication of said vehicle, and in accordance with said different scales;

means for indicating to a driver when the vehicle is in the vicinity of said predetermined portions of said area maps, and adapted to present a different map scale on said display screen in accordance with a given operating command;

said means for indicating including digital data read by said image pick-up means in said predetermined portions of said area maps when said current location indication of said vehicle is in the vicinity of said predetermined portions;

setting means for setting a starting point and at least one desired destination of said vehicle, respectively, on said display screen;

a plurality of sectioned indicating means disposed adjacent to and around substantially the entire periphery of said display screen in a divided frame fashion to indicate the up-and-down, the right-and-left, and the diagonal directions, respectively, and adapted to present an approximated indication of direction of said destination in accordance with a given operating command; and bearing indication means for detecting an orientation as viewed from said starting point towards said destination, and that as viewed from one preset destination on way of the travel path of said vehicle toward another, and presenting an approximated indication of said orientation with an arrow directed towards said destination at the place of said starting point and said one preset destination in accordance with a given operating command.

4. A current location indicating apparatus for use in an automotive vehicle according to claim 1, further comprising:

means for recording digital coded auxiliary data used to guide visual representations of said display means, and for causing said signal processing means to read digital signals taken in a photographic image form of said auxiliary data.

5. A current location indicating apparatus according to claim 1, wherein:

said signal processing means is adapted to detect the state of a power down of the indicating apparatus when said vehicle stops; and said apparatus further comprises non-volatile memory means for storing backup data, including at least the number of an area map currently on said display at the start of the power-down state and the data relating to the current location and direction of heading of said vehicle in terms of the two-dimensional coordinates.

6. A current location indicating apparatus according to claim 1, further comprising:

means for presenting an auxiliary marking which represents a reservation of a preselected traveling direction at at least one predetermined location on said display screen in accordance with a given operating command, said auxiliary marking being automatically presented together with said map and said marking on said display screen when said vehicle is in the vicinity of the predetermined location.

7. A current location indicating apparatus for use in an automotive vehicle according to claim 2, further comprising:
means for recording digital coded auxiliary data used to guide visual representations of said display means, and for causing said signal processing means to read digital signals taken in a photographic image form of said auxiliary data.

8. A current location indicating apparatus according to claim 2, wherein:
said signal processing means is adapted to detect the state of a power down of the indicating apparatus when said vehicle stops; and
said apparatus further comprises non-volatile memory means for storing backup data, including at least the number of an area map currently on said display at the start of the power-down state and the data relating to the current location and direction of heading of said vehicle in terms of the two-dimensional coordinates.

9. A current location indicating apparatus according to claim 2, further comprising:
means for presenting an auxiliary marking which represents a reservation of a preselected traveling direction at at least one predetermined location on said display screen in accordance with a given operating command, said auxiliary marking being automatically presented together with said map and said marking on said display screen when said vehicle is in the vicinity of the predetermined location.

10. A current location indicating apparatus for use in an automotive vehicle according to claim 3, further comprising:
means for recording digital coded auxiliary data used to guide visual representations of said display means, and for causing said signal processing means to read digital signals taken in a photographic image form of said auxiliary data.

11. A current location indicating apparatus according to claim 3, wherein:
said signal processing means is adapted to detect the state of a power down of the indicating apparatus when said vehicle stops; and
said apparatus further comprises non-volatile memory means for storing backup data, including at least the number of an area map currently on said display at the start of the power-down state and the data relating to the current location and direction of heading of said vehicle in terms of the two-dimensional coordinates.

12. A current location indicating apparatus according to claim 3, further comprising:
means for presenting an auxiliary marking which represents a reservation of a preselected traveling direction at at least one predetermined location on said display screen in accordance with a given operating command, said auxiliary marking being automatically presented together with said map and said marking on said display screen when said vehicle is in the vicinity of the predetermined location.

* * * * *